(12) United States Patent
Bartel et al.

(10) Patent No.: US 9,956,718 B2
(45) Date of Patent: May 1, 2018

(54) METHOD OF FORMING A TUBE FROM A THERMOPLASTIC SANDWICH SHEET

(71) Applicant: The Boeing Company, Seal Beach, CA (US)

(72) Inventors: Aaron W. Bartel, Mountlake Terrace, WA (US); John B. Moser, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 13/621,991

(22) Filed: Sep. 18, 2012

(65) Prior Publication Data

US 2014/0076479 A1    Mar. 20, 2014

(51) Int. Cl.
| | |
|---|---|
| *B29C 53/04* | (2006.01) |
| *B29C 53/42* | (2006.01) |
| *B29L 31/30* | (2006.01) |
| *B29C 65/08* | (2006.01) |
| *B29C 65/36* | (2006.01) |
| *B29C 65/50* | (2006.01) |
| *B29C 65/56* | (2006.01) |

(Continued)

(52) U.S. Cl.
CPC .............. *B29C 53/04* (2013.01); *B29C 53/42* (2013.01); *B29C 53/385* (2013.01); *B29C 53/84* (2013.01); *B29C 65/08* (2013.01); *B29C 65/36* (2013.01); *B29C 65/48* (2013.01); *B29C 65/5071* (2013.01); *B29C 65/5085* (2013.01); *B29C 65/56* (2013.01); *B29C 66/1142* (2013.01); *B29C 66/1222* (2013.01); *B29C 66/1224* (2013.01); *B29C 66/1226* (2013.01); *B29C 66/4322* (2013.01); *B29C 66/49* (2013.01);

(Continued)

(58) Field of Classification Search
CPC . B29C 65/00; B29C 53/42; B29C 2043/3644; B29C 35/0233; B29C 53/36; B29C 66/4322; B29C 53/382; B29C 53/82; B29C 65/08; B29C 66/432; B29C 66/721; B29C 51/00; B29C 53/04; B29C 2791/006; B29C 53/385; B29C 53/08; B29C 53/84; B29C 65/36; B29C 65/48; B29C 65/5071; B29C 65/5085; B29C 65/56; B29C 66/1142; B29C 66/1222; B29D 23/001; B32B 37/00
USPC .................................................. 156/73.1, 218
See application file for complete search history.

(56) References Cited

U.S. PATENT DOCUMENTS

| | | | |
|---|---|---|---|
| 4,900,596 | A | 2/1990 | Peacock |
| 5,208,051 | A | 5/1993 | Berg |

(Continued)

FOREIGN PATENT DOCUMENTS

| | | |
|---|---|---|
| EP | 1314539 | 5/2003 |
| EP | 1388407 | 2/2004 |

(Continued)

OTHER PUBLICATIONS

Tencate, "Cetex Product Sheet", retrieved on Jul. 18, 2012.

(Continued)

*Primary Examiner* — Michael N Orlando
*Assistant Examiner* — Cynthia L Schaller

(57) ABSTRACT

A method of forming a structural tube may include urging a substantially flat thermoplastic sandwich sheet against a mandrel and heating the thermoplastic sandwich sheet to a temperature below a glass transition temperature. The method may further include allowing the thermoplastic sandwich sheet to cool and removing the mandrel, thereby forming a tube portion.

19 Claims, 14 Drawing Sheets

(51) Int. Cl.
  *B29L 23/00* (2006.01)
  *B29C 65/00* (2006.01)
  *B29K 79/00* (2006.01)
  *B29C 53/38* (2006.01)
  *B29C 53/84* (2006.01)
  *B29K 101/12* (2006.01)
  *B29L 9/00* (2006.01)
  *B29C 65/48* (2006.01)

(52) U.S. Cl.
  CPC ...... *B29C 66/53243* (2013.01); *B29C 66/547* (2013.01); *B29C 66/71* (2013.01); *B29C 66/721* (2013.01); *B29C 66/723* (2013.01); *B29C 66/727* (2013.01); *B29C 66/72523* (2013.01); *B29C 66/72525* (2013.01); *B29C 66/73921* (2013.01); *B29C 66/81455* (2013.01); *B29C 2791/006* (2013.01); *B29K 2079/085* (2013.01); *B29K 2101/12* (2013.01); *B29L 2009/00* (2013.01); *B29L 2023/22* (2013.01); *B29L 2031/3076* (2013.01); *Y10T 156/1038* (2015.01)

(56) References Cited

U.S. PATENT DOCUMENTS

2002/0038687 A1* 4/2002 Anderson ........... B29C 65/5042
                                                                156/275.7
2005/0284562 A1* 12/2005 Frantz .................... B29C 65/56
                                                                156/196
2008/0308674 A1  12/2008 Frantz
2010/0051182 A1   3/2010 Graham
2012/0076973 A1*  3/2012 Guzman et al. .............. 428/113

FOREIGN PATENT DOCUMENTS

| EP | 1388408 | 2/2004 |
| FR | 2952323 | 5/2011 |
| GB | 2308092 | 6/1997 |
| JP | H05-116210 | 5/1993 |
| JP | H11291348 | 10/1999 |
| WO | WO2011/057994 A | 5/2011 |
| WO | WO 2011057994 A1 * | 5/2011 |

OTHER PUBLICATIONS

Torr, "Vacuum Bagging Systems," Oct. 16, 2003.
Jeffrey Jansen, Plastics Engineering, "Understanding Creep Failure of Plastics," dated Jul. 2015.
Wikkipedia, Creep, retrieved Sep. 17, 2015.
Chinese Patent Office, Chinese Office Action for Appl. No. 2013800482455, dated Oct. 26, 2016.
Japanese Patent Office, Japanese Office Action for Appl. No. 2015-531921, dated Mar. 14, 2017.
European Patent Office, Office Action for Appl. No. 13744899.9, dated Nov. 23, 2017.

* cited by examiner

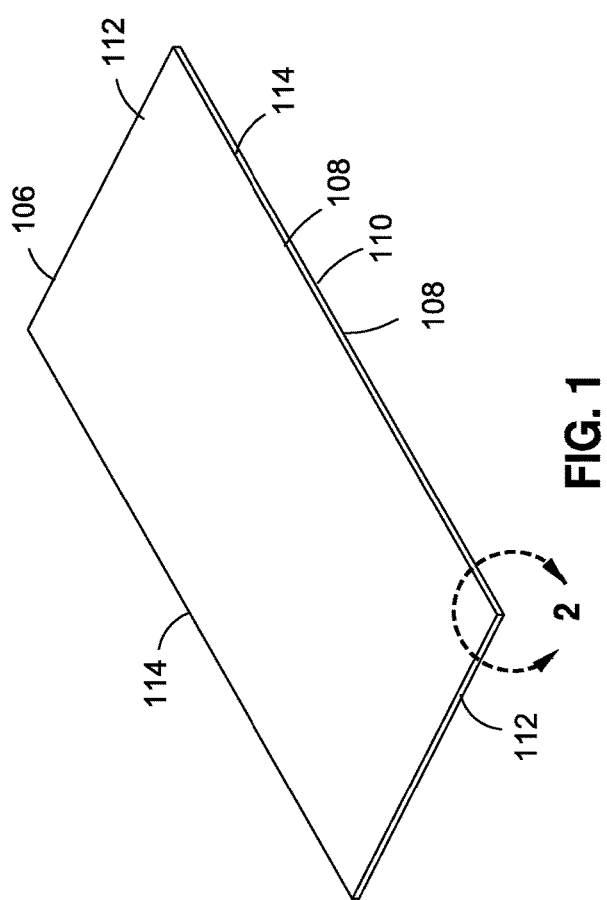
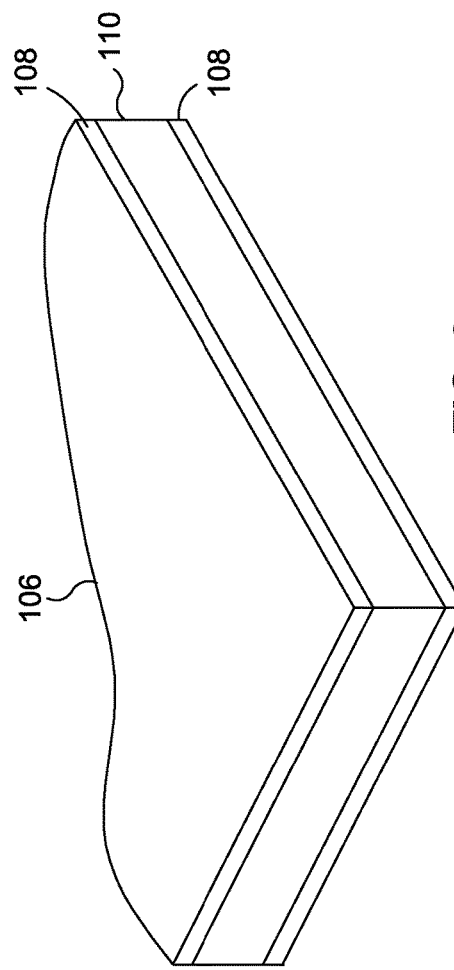

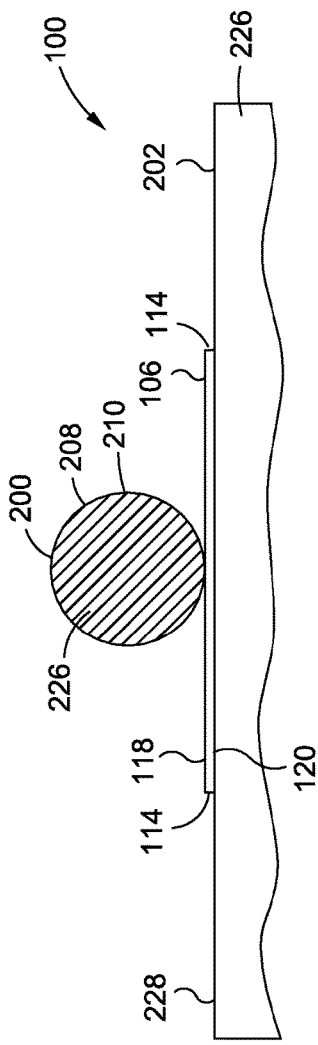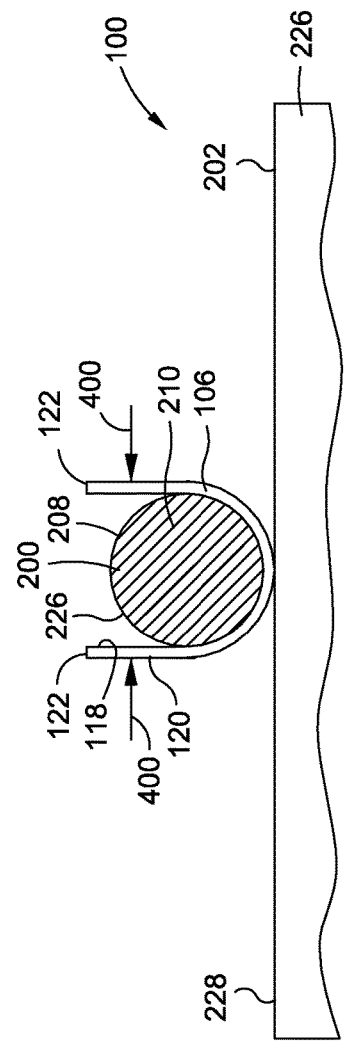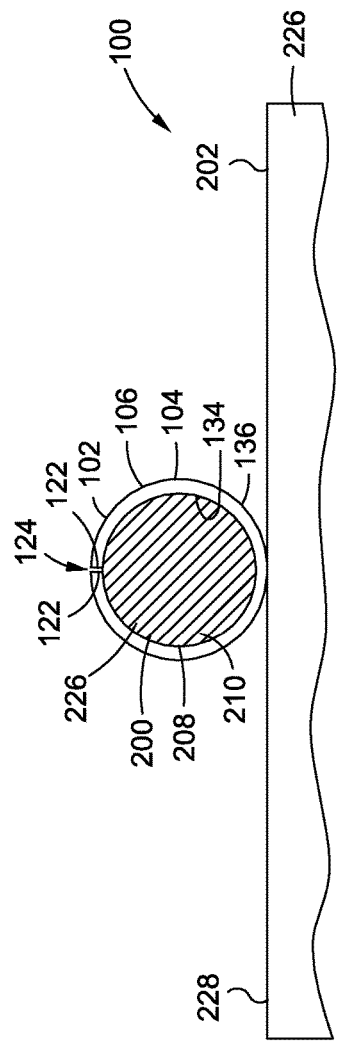

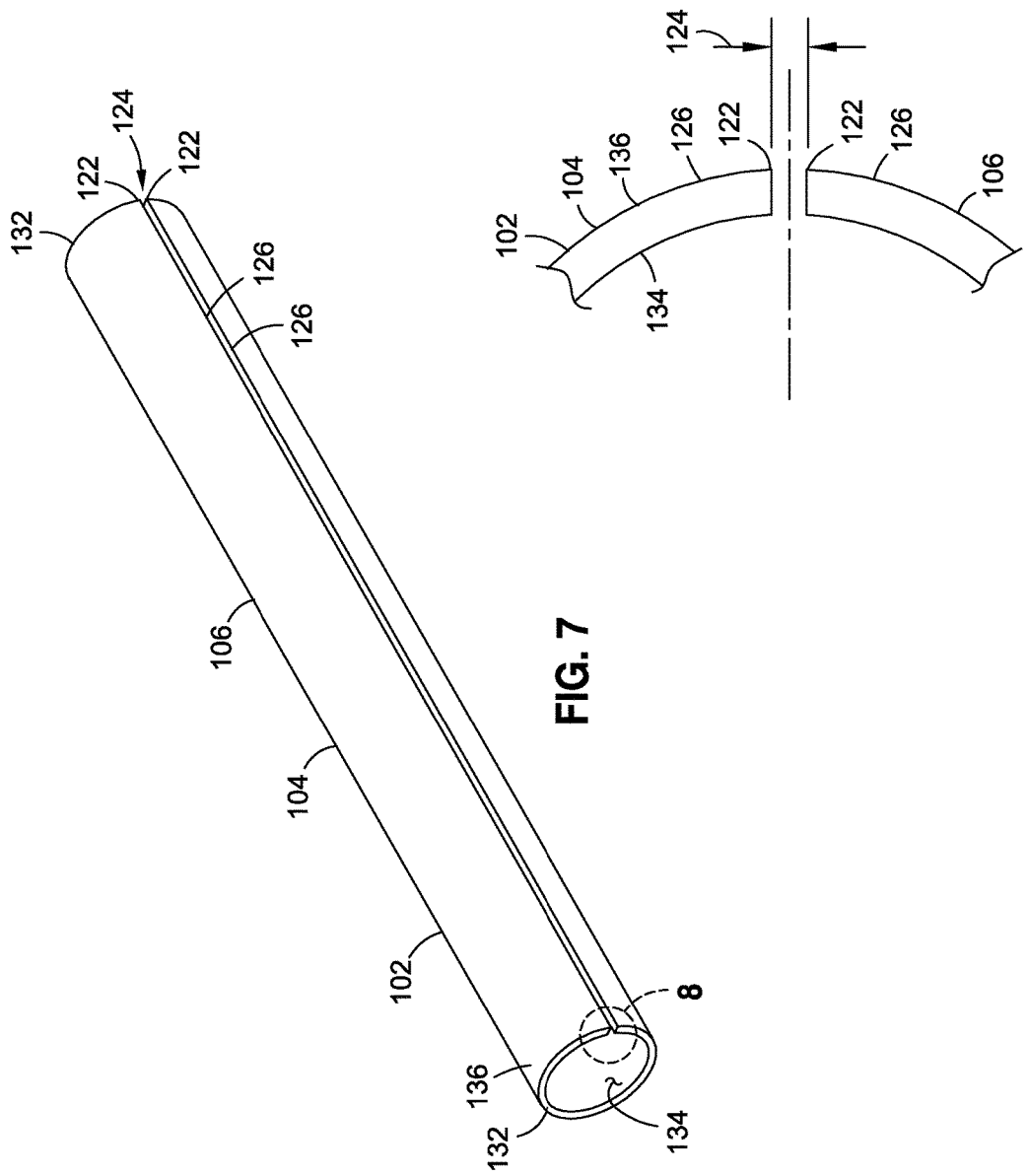

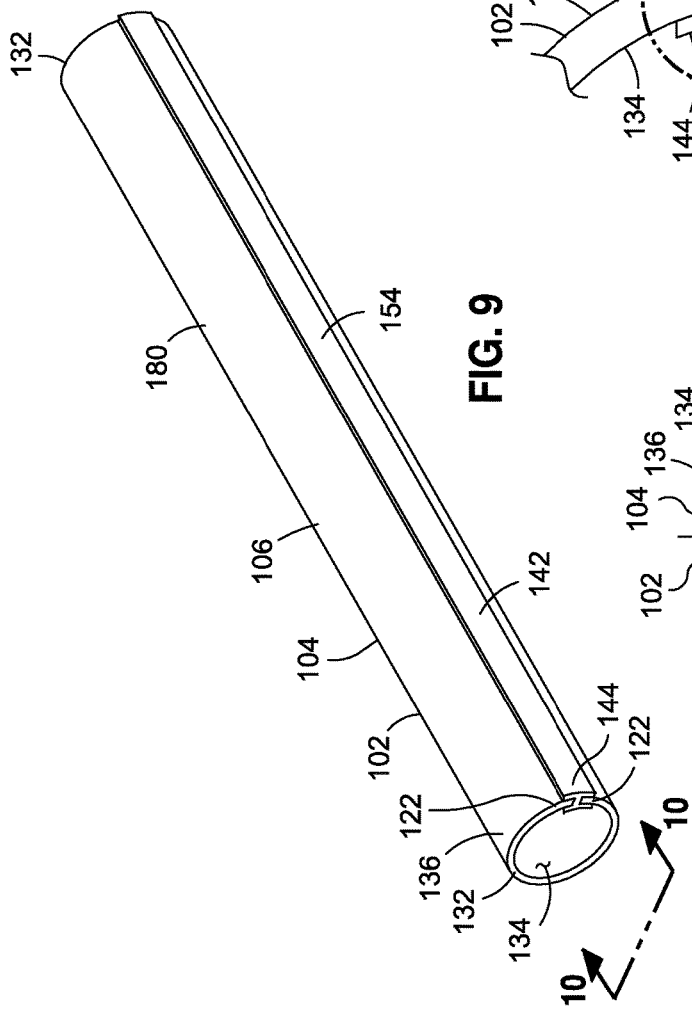
FIG. 9
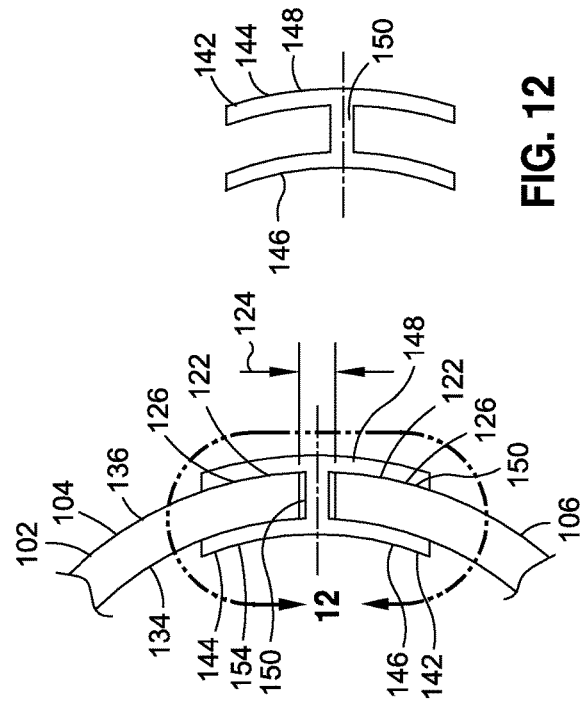
FIG. 11
FIG. 12
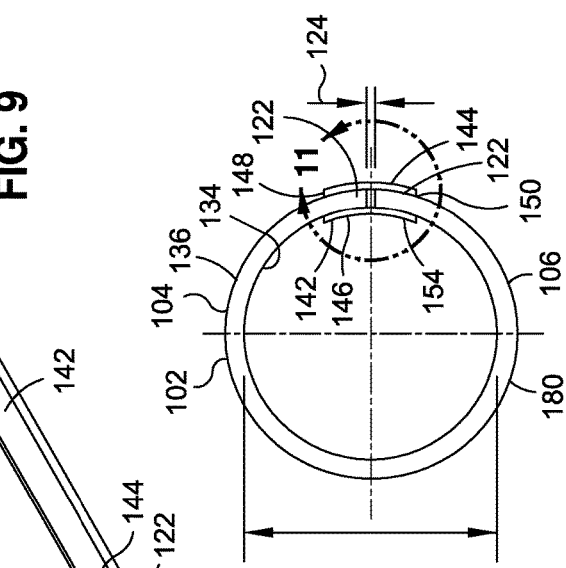
FIG. 10

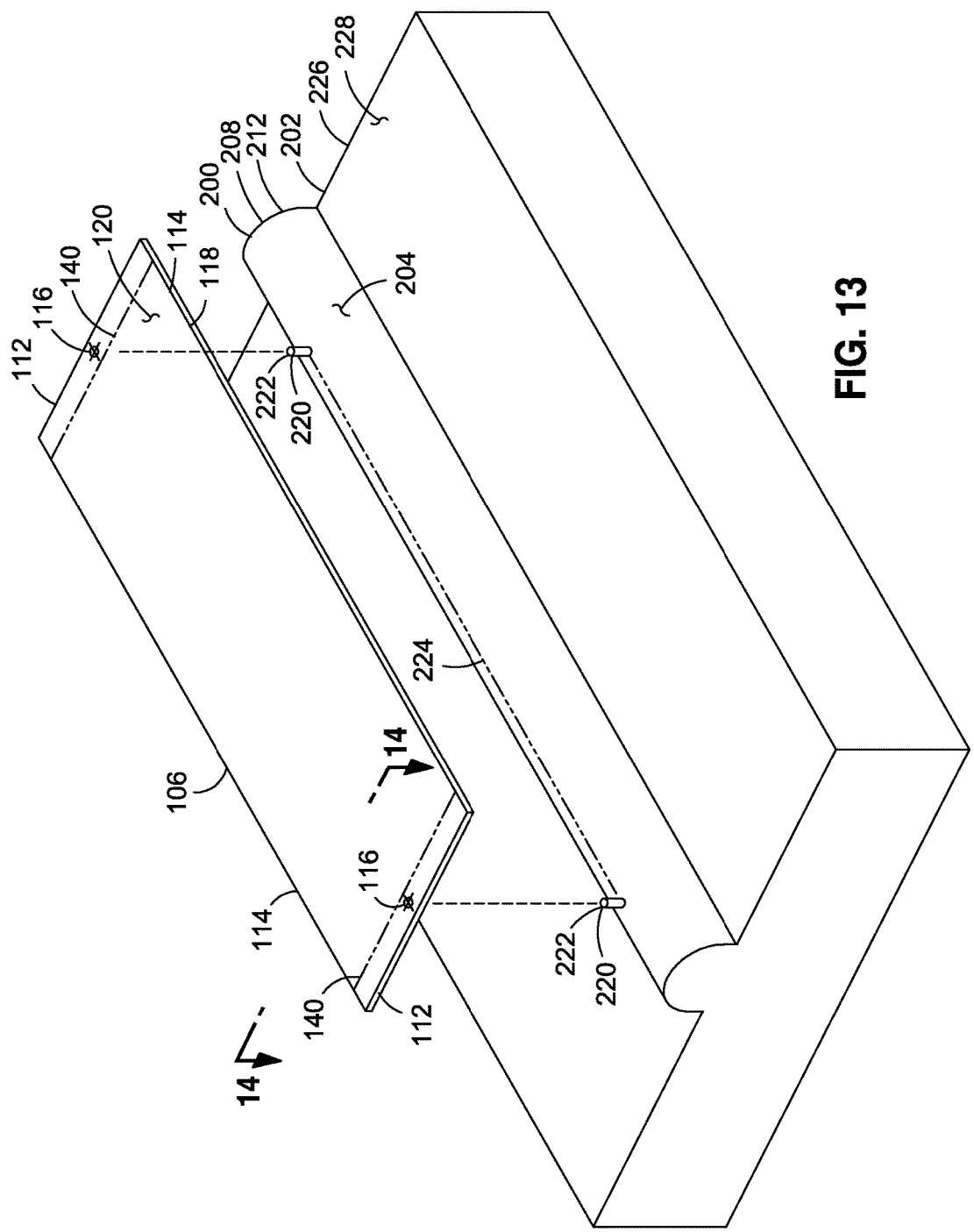

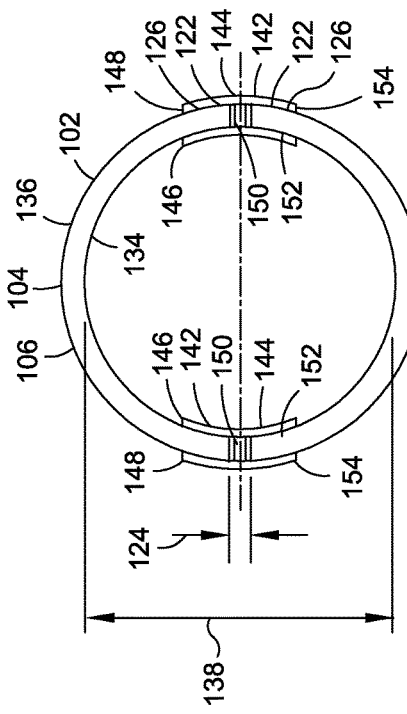
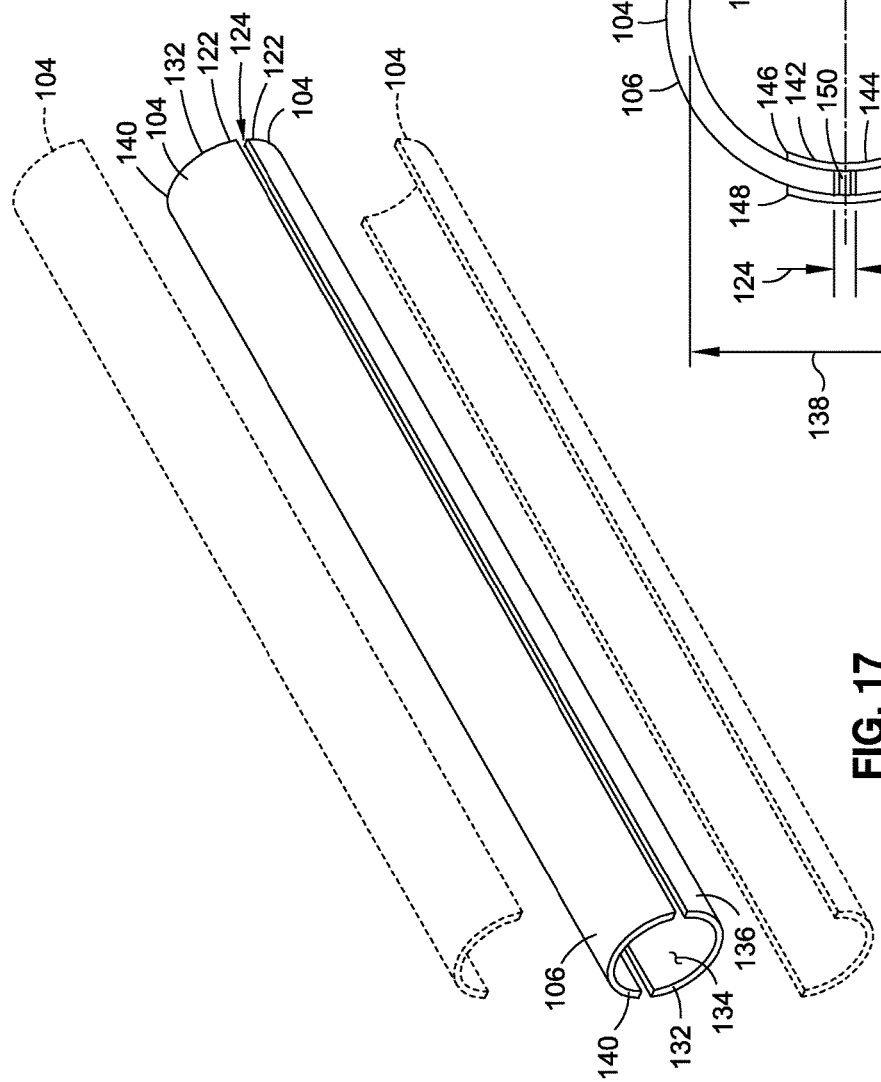

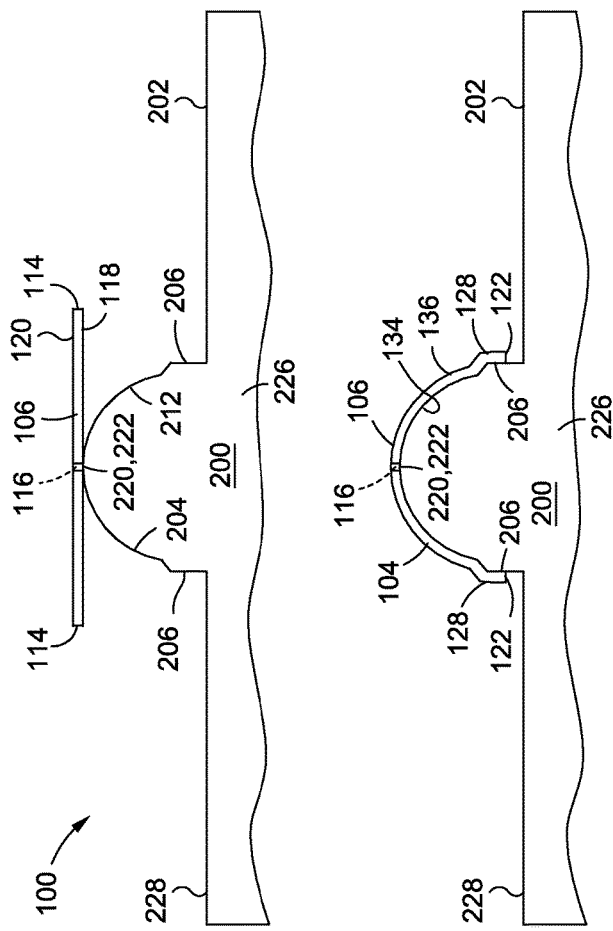
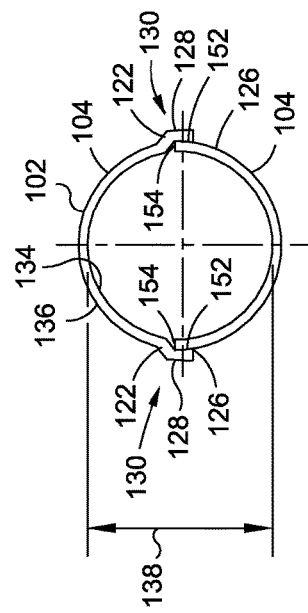
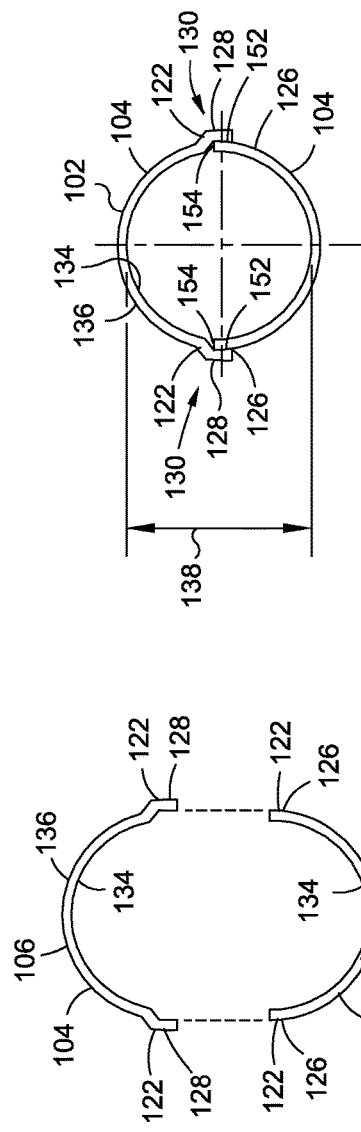

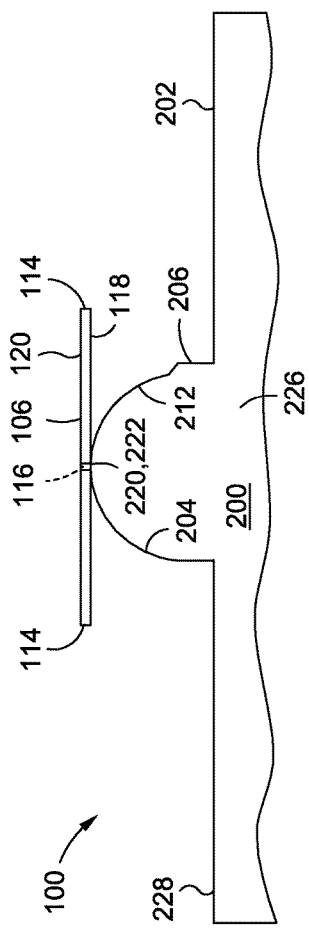
FIG. 23
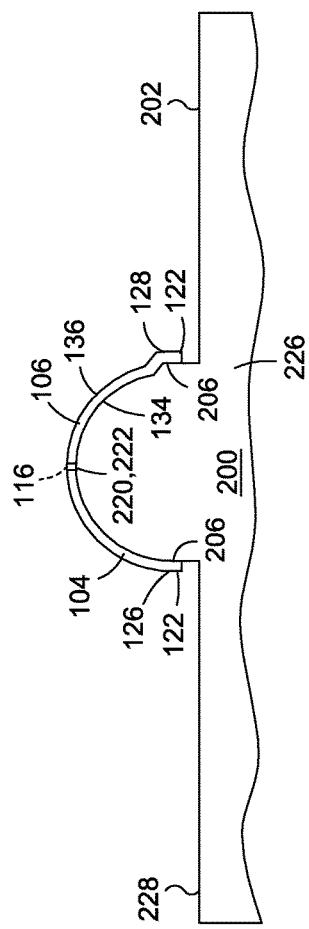
FIG. 24
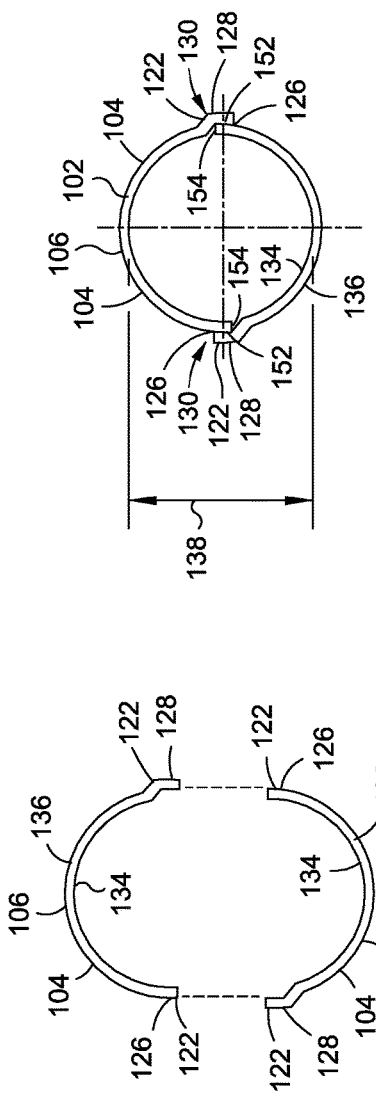
FIG. 25
FIG. 26

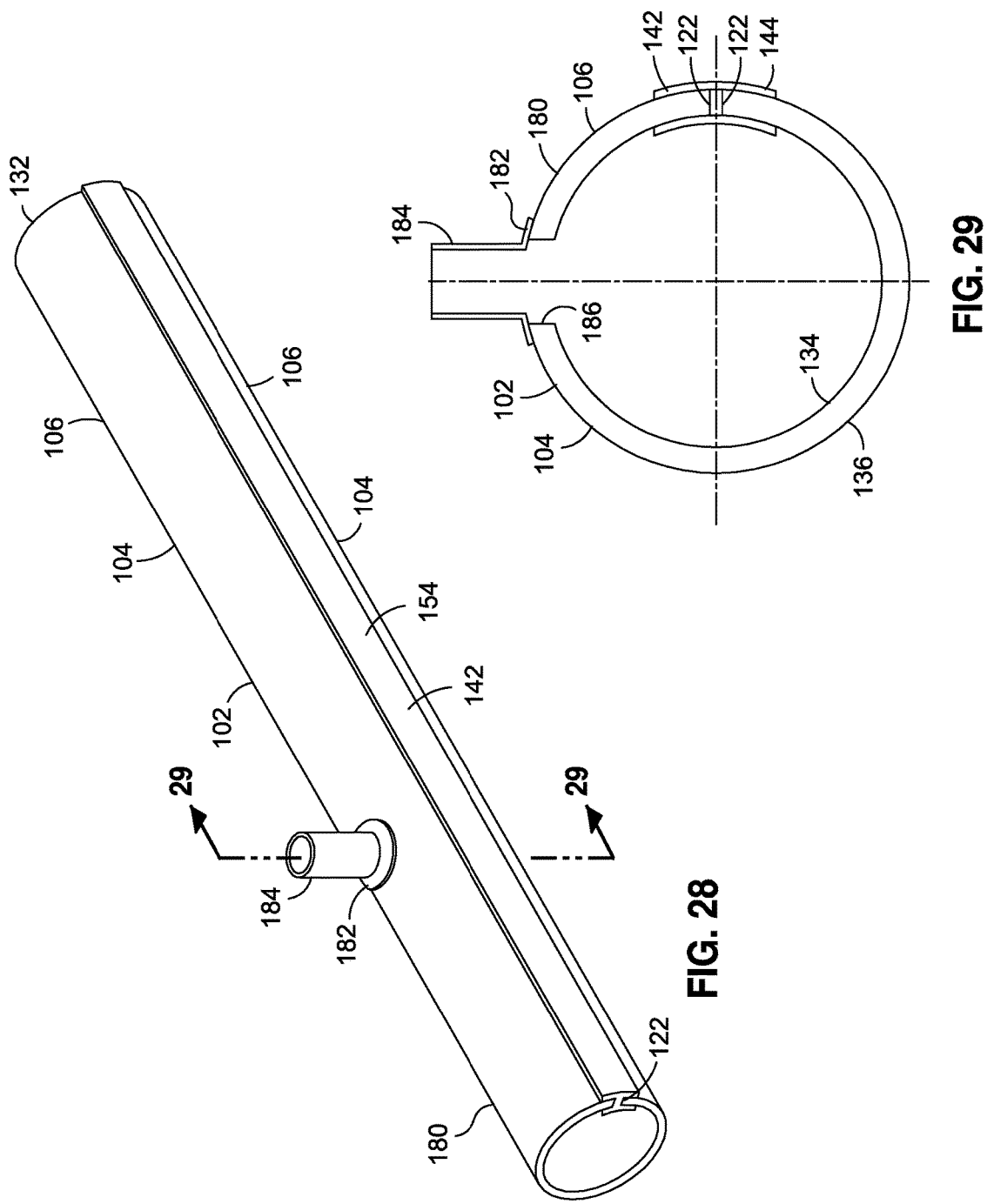

METHOD OF FORMING A TUBE FROM A THERMOPLASTIC SANDWICH SHEET

FIELD

The present disclosure relates generally to structural tubes and, more particularly, to a method for forming a tube or a duct from thermoplastic composite materials.

BACKGROUND

Aircraft such as commercial airliners typically include a variety of ducts for routing fluids such as air throughout the aircraft. For example, a commercial aircraft may include multiple ducts for routing conditioned air throughout the aircraft cabin as part of the aircraft environmental control system. Because of the need to provide the conditioned air at a controlled temperature, environmental control system ducts may be insulated.

Current methods for manufacturing ducts for an aircraft include the use of casting molds. Fiberglass may be laid up over one or more casting molds. After the fiberglass cures, foam may be separately bonded to the fiberglass to provide insulative capability for the duct. Unfortunately, the process of manufacturing casting molds is labor intensive. In addition, the use of casting molds generates large amounts of scrap material and/or waste material which increases the overall cost of the duct.

In another method, a plaster mandrel may be employed for laying up composite material or plies over the plaster mandrel. After the composite plies are cured, the plaster mandrel may be destroyed during the process of separating the duct from the mandrel which results in a large amount of waste material. In addition, the process of laying up composite plies on the plaster mandrel is time-consuming and labor intensive. Furthermore, for thermosetting composite materials, the thermosetting material must be stored at a relatively cold temperature until ready for use. The cost of storing (e.g., refrigerating) the thermosetting composite materials adds to the cost of the duct.

As can be seen, there exists a need in the art for a method of forming a duct such as for an environmental control system of an aircraft and wherein the duct can be produced without the generation of large amounts of scrap or waste material. Furthermore, there exists a need in the art for a method of forming a duct that requires a minimal amount of labor and which can be produced in a relatively short period of time. In addition, there exists a need in the art for a relatively simple method of forming a lightweight duct that can be fabricated at relatively low cost.

SUMMARY

The above-noted needs associated with prior art methods for forming ducts or structural tubes are specifically addressed and alleviated by the present disclosure which provides a method of forming a structural tube from a substantially flat thermoplastic sandwich sheet. The method may include urging the substantially flat thermoplastic sandwich sheet against a mandrel while heating the thermoplastic sandwich sheet to a temperature below a glass transition temperature. The method may further include allowing the thermoplastic sandwich sheet to cool and removing the mandrel, thereby forming a tube portion (e.g., a tube shell such as a tube half) of a structural tube or duct.

In a further embodiment, disclosed is a method of forming a tube which may include positioning a substantially flat thermoplastic sandwich sheet on a mandrel. The method may include mounting a forming sheet over the thermoplastic sandwich sheet, heating the thermoplastic sandwich sheet, and applying a forming pressure to the thermoplastic sandwich sheet using the forming sheet. The method may additionally include urging the thermoplastic sandwich sheet against the mandrel surface in response to applying the forming pressure, allowing the thermoplastic sandwich sheet to cool to ambient temperature, and removing the mandrel, thereby forming a tube portion.

Also disclosed is a method of forming a duct including the steps of positioning a substantially flat thermoplastic sandwich sheet on a mandrel, and heating the thermoplastic sandwich sheet. The method may additionally include urging the thermoplastic sandwich sheet against the mandrel, allowing the thermoplastic sandwich sheet to cool, and removing the mandrel, thereby forming a tube portion. The method may further include forming a hole in the tube portion, and mounting a hollow tubular spud to the tube portion in general alignment with the hole such that the spud extends outwardly from the tube portion.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of a substantially flat thermoplastic sandwich sheet;

FIG. 2 is a perspective view of a portion of the thermoplastic sandwich sheet of FIG. 1 and illustrating a pair of consolidated face sheets interconnected by a core;

FIG. 4 is an end view of the forming system taken along line 4 of FIG. 3 and illustrating a rounded cross-sectional shape of the mandrel and the substantially flat thermoplastic sandwich sheet;

FIG. 5 is an end view of the forming system of FIG. 4 and illustrating a forming pressure applied to the thermoplastic sandwich sheet to urge the thermoplastic sandwich sheet against the mandrel while the thermoplastic sandwich sheet is heated;

FIG. 6 is an end view of the forming system of FIG. 5 and illustrating the thermoplastic sandwich sheet wrapped around the mandrel;

FIG. 7 is a perspective view of the thermoplastic sandwich sheet formed into a tube portion;

FIG. 8 an end view of the structural tube taken along line 8 of FIG. 7 and illustrating a spacing between an opposing pair of tube side edges of the structural tube;

FIG. 9 is a perspective view of a structural tube having a longitudinal splice member for interconnecting the tube side edges;

FIG. 10 is an end view of the structural tube taken along line 10 of FIG. 9 and illustrating the splice member interconnecting the tube side edges;

FIG. 11 is an enlarged view of the splice member taken along line 11 of FIG. 10 and illustrating the splice member interconnecting the tube side edges;

FIG. 12 is an end view of the splice member taken along line 12 of FIG. 11;

FIG. 13 is a perspective view of a forming system illustrating an embodiment of a mandrel having a semi-rounded cross-sectional shape and further illustrating a substantially flat thermoplastic sandwich sheet disposed above the mandrel prior to positioning thereof on the mandrel using a pair of alignment devices;

FIG. 17 is a perspective view of a pair of tube portions prior to joining via a pair of splice members;

FIG. 18 is an end view of a structural tube illustrating the pair of splice members coupling the tube portions together;

FIG. 19 is an end view of a forming system including a mandrel in an alternative embodiment having a pair of mandrel shoulders formed in the opposing mandrel sides;

FIG. 20 is an end view of the forming system of FIG. 20 and illustrating a pair of lip edges formed on the opposing tube side edges of the tube portion as a result of the urging of the thermoplastic sandwich sheet against the mandrel shoulders;

FIG. 21 is an exploded end view of a pair of the tube portions wherein one of the tube portions has lip edges for coupling to the straight edges of the remaining one of the tube portions;

FIG. 22 is an end view of a structural tube formed by the assembly of the tube portions shown in FIG. 21;

FIG. 23 is an end view of a forming system including a mandrel in an alternative embodiment having a mandrel shoulder formed on one side of the mandrel;

FIG. 24 is an end view of the forming system of FIG. 23 and illustrating a single lip edge formed on one of the tube side edges of the tube portion;

FIG. 25 is an exploded end view of a pair of tube portions wherein each one of the tube portions has a lip edge and a straight edge;

FIG. 26 is an end view of a structural tube form by assembling the tube portions shown in FIG. 25;

FIG. 28 is a perspective view of a structural tube having a spud mounted thereto;

FIG. 29 is a cross-sectional view of the structural tube taken along line 29 of FIG. 28 and illustrating the attachment of the spud to the tube portion;

DETAILED DESCRIPTION

Figure 3:
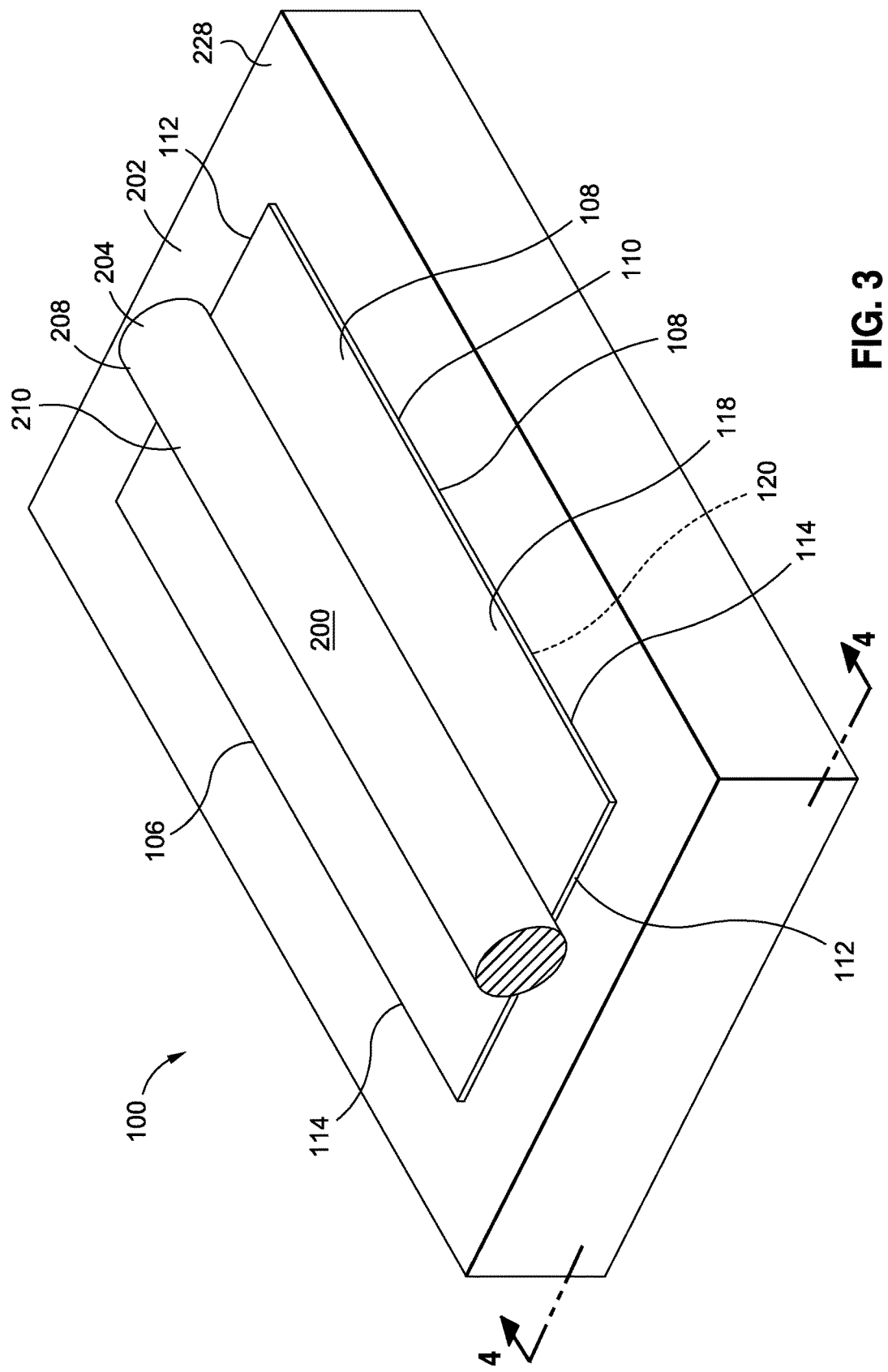
FIG. 3 is a perspective view of a forming system wherein a thermoplastic sandwich sheet is mounted on a forming surface and having a mandrel mounted on the thermoplastic sandwich sheet prior to forming the thermoplastic sandwich sheet into the shape of the mandrel.

Referring now to the drawings wherein the showings are for purposes of illustrating various embodiments of the present disclosure, shown in FIG. 1 is a substantially flat or substantially planar thermoplastic sandwich sheet 106 as may be formed into a structural tube 102 (FIG. 10). The structural tube 102 may be implemented in a variety of applications including, but not limited to, implementation as a duct 180 (FIG. 28) of an environmental control system (not shown) of an aircraft (not shown). The structural tube 102 may be formed by wrapping the substantially flat thermoplastic sandwich sheet 106 around a mandrel 200 (FIG. 3) while heating the thermoplastic sandwich sheet 106 close to a glass transition temperature of the thermoplastic sandwich sheet 106. After wrapping the thermoplastic sandwich sheet 106 around the mandrel 200, the thermoplastic sandwich sheet 106 may be passively and/or actively cooled and the mandrel 200 may be removed to thereby form a tube portion 104 (FIG. 6). One or more of the tube portions 104 may be assembled such as by using one or more longitudinal splice members 142 (FIG. 10) to form a structural tube 102. Prior to assembly, one or more of the tube portions 104 may be trimmed and a spacing 124 (FIG. 10) between the side edges 122 (FIG. 10) may be adjusted such that a desired final tube width 138 (FIG. 10) or final tube diameter may be achieved.

In FIG. 1, the substantially flat thermoplastic sandwich sheet 106 may be provided as a commercially-available sheet in a standard size and which may be cut down to a desired shape and size prior to forming into a tube portion 104 (FIG. 6). The thermoplastic sandwich sheet 106 may be provided in an orthogonal shape such as the rectangular shape with opposing sheet ends 112 and opposing sheet sides 114 as illustrated in FIG. 1. However, the thermoplastic sandwich sheet 106 may be provided in any size, shape, and configuration and is not limited to an orthogonal shape having generally straight sides.

In FIG. 2, the thermoplastic sandwich sheet 106 may comprise a spaced pair of face sheets 108 and a core 110 interconnecting the face sheets 108. Both the face sheets 108 and the core 110 may be formed of thermoplastic material. The face sheets 108 may be formed of pre-consolidated thermoplastic material which may optionally include fiber reinforcement. For example, the face sheets 108 may be formed of polyetherimide (PEI) that may optionally be reinforced with fibers such as glass fibers, carbon fibers, aramid fibers, or other types of fibers, without limitation. In an embodiment, the thermoplastic face sheets 108 may be reinforced with structural fabric such as woven glass fabric to improve the mechanical properties of the face sheets 108. For example, woven fiberglass fabric may improve the strength capabilities and/or the impact resistance of the face sheets 108. Each one of the face sheets 108 may have a thickness of between approximately 0.02-0.12 inch. However, the face sheets 108 may be provided in any thickness, without limitation.

In FIG. 2, the core 110 may also be formed of thermoplastic material. For example, the core 110 may be formed of polyetherimide (PEI), and may be provided in any size, shape, and configuration, without limitation. In an embodiment, the core 110 may comprise a thermoplastic foam core. Alternatively, the core 110 may comprise a thermoplastic tubular core such as a thermoplastic honeycomb core wherein the honeycomb cells may be oriented generally orthogonally relative to a plane of the face sheets 108. In an embodiment, the thermoplastic sandwich sheet 106 may comprise of Cetex System3™ honeycomb core-stiffened sandwich panel, commercially available from TenCate Advanced Composites of Nijverdal, The Netherlands. In an embodiment, the PEI may comprise Ultem™ thermoplastic material which may be commercially available from Saudi Basic Industries Corporation of Riyadh, Saudi Arabia.

However, the thermoplastic sandwich sheet 106 may be formed of any type of thermoplastic material, without limitation. In this regard, the face sheets 108 and/or the core 110 of the thermoplastic sandwich sheet 106 may be formed of any one of the following thermoplastic material types or any combination thereof: acrylics, nylon, fluorocarbons, polyamides, polyethylenes, polyesters, polypropylenes, polycarbonates, polyurethanes, polyetheretherketone, and polyetherketoneketone. In an embodiment, the core 110 of the thermoplastic sandwich sheet 106 may have a thickness of between approximately 0.12-1.0 inch. However the core 110 may be provided in any thickness, without limitation.

In FIG. 3, shown is a forming system 100 comprising a forming surface 228 and having a thermoplastic sandwich sheet 106 supported on the forming surface 228. A mandrel 200 is positioned on the thermoplastic sandwich sheet 106. The mandrel 200 may represent the final shape of the structural tube 102 (FIG. 10). The mandrel 200 may be formed in a singly-curved rounded cross-sectional shape such as the cylindrical shape illustrated in FIG. 3. However, the mandrel 200 may be formed in mandrel shapes 208 other than a cylindrical shape. For example, the mandrel shape 208 may comprise a semi-round cross-sectional shape 212 (FIG. 13), a faceted shape (not shown) having one or more relatively straight sides, or the mandrel shape 208 may comprise any one of a variety of other shapes.

A heating device 226 may be included with the forming system 100 for elevating the temperature of the thermoplastic sandwich sheet 106 to a temperature approaching a glass transition temperature of the thermoplastic material. For example, the mandrel 200 may include a heating device 226 (FIG. 4) for elevating the temperature of the thermoplastic sandwich sheet 106. Heat from the mandrel 200 may be conductively transferred into the thermoplastic sandwich sheet 106 to elevate and/or maintain the temperature of the thermoplastic sandwich sheet 106 while the thermoplastic sandwich sheet 106 is urged toward the mandrel 200 or wrapped around the mandrel 200. Optionally, the forming system 100 may be transferred to an oven (not shown) for elevating the temperature of the mandrel 200, elevating the temperature of the thermoplastic sandwich sheet 106, or elevating the temperature of any other hardware that may be associated with the forming system 100.

FIG. 4 is an end view of the forming system 100 of FIG. 3. The thermoplastic sandwich sheet 106 may include a sheet inner surface 118 and a sheet outer surface 120. The sheet outer surface 120 may be disposed in abutting contact with a support surface such as the mandrel base 202 such that heat may be conductively transferred from the mandrel base 202 into the thermoplastic sandwich sheet 106. The sheet inner surface 118 may be in contact with the mandrel surface 204 (FIG. 13). The mandrel 200 may be generally centered between the sheet sides 114 of the thermoplastic sandwich sheet 106.

Figure 15:
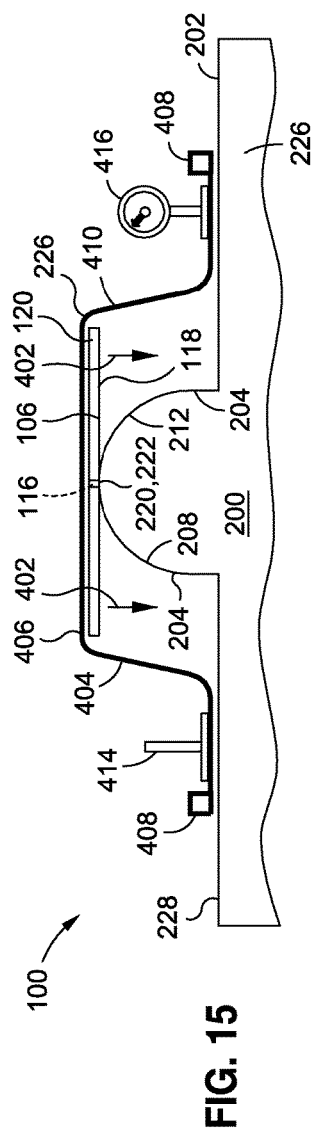
FIG. 15 is an end view of the mandrel taken along line 15 of FIG. 14 and illustrating the thermoplastic sandwich sheet positioned on the mandrel and further illustrating a forming sheet positioned over the thermoplastic sandwich sheet and a perimeter of the forming sheet being sealed to the mandrel base.

FIG. 5 is an end view of the forming system 100 illustrating forming pressure 400 applied to the thermoplastic sandwich sheet 106. The forming pressure 400 may be applied by any one of a variety of different means including by an elastic forming sheet 406 (FIG. 15). When the thermoplastic sandwich sheet 106 approaches the glass transition temperature, the thermoplastic material thereof may soften allowing the thermoplastic sandwich sheet 106 to slowly conform to the shape of the mandrel 200 under the forming pressure 400. As the thermoplastic sandwich sheet 106 is pulled toward the mandrel 200, an increasingly larger portion of the sheet inner surface 118 may come into contact with the mandrel surface 204 (FIG. 13). Heat generated by a mandrel 200 heating device 226 may be conductively transferred into the thermoplastic sandwich sheet 106 to maintain the temperature thereof approximately below the glass transition temperature such as within 0-50° F. of the glass transition temperature.

FIG. 6 is an end view of the forming system 100 illustrating a substantial entirety of the thermoplastic sandwich sheet 106 wrapped around the mandrel 200 and or confirming to the mandrel shape 208. In this regard, the thermoplastic sandwich sheet 106 is formed into a tube portion 104 containing the shape of the mandrel surface 204 (FIG. 13). The thermoplastic sandwich sheet 106 may be sized such that a width across the sheet sides 114 (FIG. 4) results in the opposing tube side edges 122 being disposed in relatively close proximity to one another. In this manner, a structural tube 102 may be formed by installing a longitudinal splice member 142 (FIG. 10) to connect the tube side edges 122 to one another.

FIG. 7 shows the tube portion 104 with the mandrel 200 (FIG. 6) removed after the tube portion 104 is passively or actively cooled to a desired temperature. Passive cooling may comprise halting the application of heat to the thermoplastic sandwich sheet 106 and allowing the thermoplastic sandwich sheet 106 to cool to ambient temperature while the thermoplastic sandwich sheet 106 is maintained in the shape of the mandrel 200 shown in FIGS. 4-6. Active cooling may include the use of a cooling device (not shown) such as a fan for blowing air over the thermoplastic sandwich sheet 106. Active cooling may also include circulating cooling fluid (not shown) through the mandrel 200, or other active or passive cooling means.

FIG. 8 is an enlarged view of a section of the tube portion 104 of FIG. 7 and illustrating the tube side edges 122 and a spacing 124 therebetween. After forming the tube portion 104, the spacing 124 between the tube side edges 122 may be adjusted in order to achieve a desired dimension of the tube portion 104. For example, the spacing 124 between the tube side edges 122 may be adjusted to achieve a desired tube width 138 (FIG. 18) or a desired tube diameter of the tube inner surface 134 as described in greater detail below.

FIG. 9 is a perspective view of a structural tube 102 comprising a tube portion 104 and a longitudinal splice member 142 coupling the tube side edges 122 together to form a tube seam 154. The tube portion 104 has opposing tube ends 132. In addition, the tube portion 104 has a tube inner surface 134 and a tube outer surface 136. Although the splice member 142 is shown as a unitary structure extending along the length of the structural tube 102, two or more individual splice members 142 may be disposed in end-to-end arrangement along a length of the tube portion 104 to join the tube side edges 122.

FIG. 10 is an end view of the structural tube 102 of FIG. 9. The splice member 142 is shown in an embodiment comprising an H-section 144 having an inner flange 146 and an outer flange 148 interconnected by a center portion 150. The tube width 138 (e.g., tube diameter) (FIG. 18) may be defined by the tube inner surface 134 and may be adjusted by adjusting the spacing 124 between the tube side edges 122. The spacing 124 may be adjusted by moving the tube side edges 122 closer together or farther apart until a desired tube width 138 is achieved. After forming the tube portion 104, one or more of the tube side edges 122 may also be trimmed to further control the spacing 124 between the tube side edges 122.

In FIG. 11, the inner flange 146 of the splice member 142 may be fastened to the tube inner surface 134 at the tube side edges 122 such as by adhesively bonding or welding the inner flange 146 to the tube inner surface 134. Likewise, the outer flange 148 may be adhesively bonded or welded to the tube outer surface 136. The center portion 150 may also be attached to the tube side edges 122 such as by adhesive bonding or welding. Non-limiting examples of methods for coupling the tube side edges 122 to the splice member 142 include mechanical fastening, adhesively bonding using a thermoplastic adhesive layer 152, and/or by ultrasonic welding, induction welding, or any one of a variety of other attachment methods or combination of methods.

In FIG. 12, shown is an embodiment of the splice member 142 configured as H-section 144 having an inner flange 146 and an outer flange 148 joined by a center portion 150. However, the splice member 142 may be provided in any cross sectional configuration for coupling the tube side edges 122 (FIG. 11) together to form a tube seam 154 (FIG. 11) and is not limited to the H-section 144 illustrated in the figures. For example, the splice member 142 may be configured as a single outer flange 148 without a center portion 150 or an inner flange 146. Alternatively, the splice member 142 may be configured as a center portion 150 without an outer flange 148 or an inner flange 146.

In an embodiment, the splice member 142 may be formed of polymeric material such as polyetherimide (PEI). However, the splice member 142 may optionally be formed of metallic material, or any other material or combination of materials. The splice member 142 material is preferably compatible with the thermoplastic sandwich sheet 106 (FIG. 11). In this regard, the splice member 142 is preferably formed of material that has a coefficient of thermal expansion that is compatible with the coefficient of thermal expansion of the thermoplastic sandwich sheet 106 in order to minimize residual stresses that may otherwise occur during temperature fluctuations when the structural tube 102 (FIG. 11) is placed in service. In addition, the splice member 142 is preferably formed of material that minimizes the occurrence of galvanic corrosion between the splice member 142 and the face sheets 108 (FIG. 3) of the thermoplastic sandwich sheet 106.

FIG. 13 is a perspective view of an embodiment of a forming system 100 (FIG. 3) for forming the thermoplastic sandwich sheet 106 into a tube portion 104 and illustrating a substantially flat thermoplastic sandwich sheet 106 disposed above the mandrel 200 prior to positioning the thermoplastic sandwich sheet 106 on the mandrel 200 for creep forming. The mandrel 200 is shown having a semi-round cross-sectional shape 212 and a generally flat mandrel base 202. The mandrel 200 and the mandrel base 202 may comprise part of a forming table (not shown) for forming the thermoplastic sandwich sheet 106. The mandrel 200 may be provided in a hollow configuration or in a solid configuration and may be formed of any material that is compatible with the temperature to which the thermoplastic sandwich sheet 106 is heated to allow for creep forming. For example, the mandrel 200 may be formed of wood, metallic material (e.g., aluminum, iron such as steel, Invar), composite material, ceramic material, or any other material or combination of materials. Advantageously, because the thermoplastic sandwich sheet 106 is maintained at a temperature that is preferably below the glass transition temperature, a mold release (not shown) may not be required. However, for certain applications or material combinations, a mold release may be applied to the mandrel 200 prior to mounting the thermoplastic sandwich sheet 106 on the mandrel 200.

In FIG. 13, the thermoplastic sandwich sheet 106 may include a set of net trim lines 140 indicating locations where the tube portion 104 (FIG. 17) may be trimmed following the forming of the tube portion 104. The mandrel 200 may include one or more alignment devices 220 for maintaining the longitudinal alignment of the thermoplastic sandwich sheet 106 relative to the mandrel 200 while urging the thermoplastic sandwich sheet 106 against the mandrel 200. The alignment devices 220 may be configured such that the thermoplastic sandwich sheet 106 may be removably coupled to the mandrel 200. For example, the alignment devices 220 may comprise a pair of tooling pins 222 that may extend upwardly or outwardly from the mandrel surface 204. The tooling pins 222 may be positioned along a tangent line 224 defined as a line along which the substantially flat thermoplastic sandwich sheet 106 initially contacts the mandrel 200. The tooling pins 222 may be sized and configured to be received within a corresponding pair of bores 116 that may formed at least partially through the thermoplastic sandwich sheet 106. In the embodiment shown, the bores 116 may advantageously be positioned outside of the net trim lines 140 on opposite sheet ends 112 of the thermoplastic sandwich sheet 106.

Figure 14:
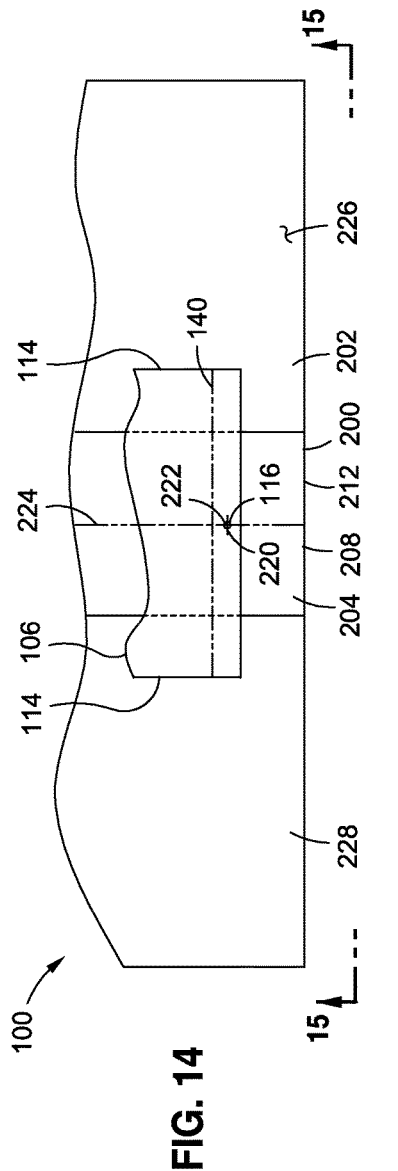
FIG. 14 is a top view of a portion of the forming system taken along line 14 of FIG. 13 and illustrating the thermoplastic sandwich sheet positioned on the mandrel and being aligned therewith by means of a mandrel tooling pin engaged to a bore in the thermoplastic sandwich sheet.

FIG. 14 is a top view of the thermoplastic sandwich sheet 106 positioned on the mandrel 200. The sheet inner surface 118 (FIG. 15) may be in contact with the mandrel surface 204 (FIG. 15) along the tangent line 224. The alignment of the thermoplastic sandwich sheet 106 with the mandrel 200 may be maintained by the engagement of the tooling pins 222 within the bores 116 of the thermoplastic sandwich sheet 106. Although the alignment devices 220 are illustrated as tooling pins 222 in the figures, the alignment devices 220 may be provided in any one of a variety of different configurations and are not limited to tooling pins 222. Furthermore, the alignment devices 220 may be located at any position along the thermoplastic sandwich sheet 106 and are not limited to locations outside of the net trim lines 140. Furthermore, although a pair of the alignment devices 220 is shown in the figures, any number of alignment devices 220 may be provided.

FIG. 15 is an end view of the forming system 100 showing the thermoplastic sandwich sheet 106 mounted on the mandrel 200 and contacting the mandrel 200 at the net trim line 140 (FIG. 14). The mandrel 200 is shown as having a mandrel surface 204 with a generally rounded shape. However, the mandrel surface 204 may be provided in any singly-curved or simply curved cross-sectional shape including, but not limited to, a round cross-sectional shape 210 (the cylindrical cross-sectional shape of FIG. 3) (FIG. 6), a semi-round cross-sectional shape 212 (FIG. 13), a faceted cross-sectional shape (not shown), or other shapes such as an elliptical shape (not shown), a rounded square shape (not shown), a rounded rectangular shape (not shown), or any other cross-sectional shape, without limitation.

FIG. 15 illustrates a pressurizing device 404 configured as a forming sheet 406 for urging the thermoplastic sandwich sheet 106 in the shape of the mandrel 200. The forming sheet 406 may be positioned over the thermoplastic sandwich sheet 106 to assist in applying forming pressure 400 (FIG. 16) to urge the thermoplastic sandwich sheet 106 against the mandrel surface 204. Forming pressure 400 may also include gravitational force 402 which may act upon the thermoplastic sandwich sheet 106 once the thermoplastic sandwich sheet 106 is heated up to a temperature approaching the glass transition temperature. The forming pressure 400 may cause the thermoplastic sandwich sheet 106 to gradually conform to the mandrel shape 208.

In an embodiment, the forming sheet 406 may be comprised of stretchable elastic material such as a rubber layer 410 such as silicone rubber. The elastic forming sheet 406 may be pre-stretched. A perimeter of the forming sheet may be mounted to a relatively rigid frame 408 that may be disposed against or sealed to the mandrel base 202. In this regard, the elastic forming sheet 406 (e.g., the rubber layer 410) may be sealed to the mandrel base 202. The pre-stretching of the forming sheet 406 may result in elastomeric force (not shown) that may assist in urging the thermoplastic sandwich sheet 106 against the mandrel surface 204. One or more vacuum ports 414 may be fluidly coupled to the forming sheet 406 and/or to the mandrel base 202 for drawing a vacuum in the region between the forming sheet 406 and the mandrel 200. A vacuum gauge 416 may be included to monitor vacuum pressure 412

Figure 16:
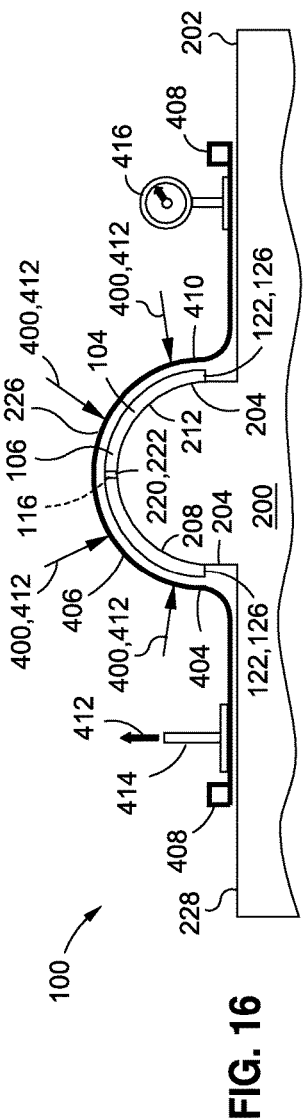
FIG. 16 is an end view of the forming system and illustrating vacuum pressure applied to the forming sheet to urge the thermoplastic sandwich sheet against the mandrel.

FIG. 16 illustrates the application of vacuum pressure 412 to the region between the forming sheet 406 (e.g., the rubber layer 410) and the mandrel 200. The vacuum pressure 412 may urge the thermoplastic sandwich sheet 106 toward the mandrel 200 during creep forming to cause the thermoplastic sandwich sheet 106 to wrap around the mandrel 200. The forming may be assisted by gravitational force 402 (FIG. 15). Forming of the thermoplastic sandwich sheet 106 against the mandrel 200 may occur when the thermoplastic sandwich sheet 106 approaches the glass transition temperature thereof. For a thermoplastic sandwich sheet 106 comprised of PEI, the glass transition temperature may be approximately 415° F. such that the thermoplastic sandwich sheet 106 may be heated to approximately 300-350° F.

The thermoplastic sandwich sheet 106 may be heated by any one of a variety of means. For example, the thermoplastic sandwich sheet 106 may be placed in an oven as a separate component, or the thermoplastic sandwich sheet 106 may be mounted on the mandrel 200 and the mandrel 200 and thermoplastic sandwich sheet 106 may be positioned inside an oven. Alternatively, or additionally, the thermoplastic sandwich sheet 106 may be heated with a heating device 226 (FIG. 23) such as a heating pad that may be applied to the thermoplastic sandwich sheet 106 or to the forming sheet 406. For example, the heating pad may comprise a resistance heating element that may be positioned on top of the forming sheet 406. Heat from the heating device 226 may conductively heat the forming sheet 406 which, in turn, may conductively heat the thermoplastic sandwich sheet 106. The mandrel 200 may optionally be heated in order to assist in maintaining the thermoplastic sandwich sheet 106 at the desired temperature during the forming process. However, the thermoplastic sandwich sheet 106 may be heated by any one of a variety of means including, but not limited to, induction heating, radiation heating, or other heating methods.

FIG. 17 illustrates a pair of tube portions 104 that may be formed using the mandrel 200 illustrated in FIGS. 13-16. The tube portions 104 may be assembled to form a structural tube 102 (FIG. 11). Each one of the tube portions 104 is shown as having tube side edges 122. Each one of the tube side edges 122 is shown having a straight edge 126 (FIG. 18) configuration. As indicated earlier, the tube side edges 122 may be trimmed prior to assembling the tube portions 104.

FIG. 18 is an end view of the structural tube 102 that may be formed by assembling the pair of tube portions 104 illustrated in FIG. 17. The relative position of the tube portions 104 may be adjusted in order to achieve a desired spacing 124 between the tube side edges 122 on each side of the structural tube 102. The spacing 124 adjustment may also be facilitated by trimming the tube side edges 122 as indicated above. By adjusting the spacing 124 between the tube side edges 122, a predetermined tube width 138 (FIG. 18) may be achieved. For example, for the cylindrically shaped structural tube 102 illustrated in FIG. 18, the spacing 124 may be adjusted to achieve a desired tube inner diameter 138 of the structural tube 102. The tube side edges 122 may be coupled together using a pair of splice members 142 to form a tube seam 154 on each side of the structural tube 102. As indicated earlier, the splice members 142 may be attached to the tube side edges 122 by any suitable fastening means such as by applying an adhesive layer 152 between the splice members 142 and the tube portions 104.

FIG. 19 is an end view of the mandrel 200 in an embodiment having a pair of mandrel shoulders 206 positioned on each side of the mandrel 200. The forming sheet 406 of FIG. 15-16 is omitted from FIG. 19 for clarity. The mandrel shoulders 206 may comprise separate strips (not shown) that may be separately attached (e.g., mechanically fastened) to the mandrel 200 such that the mandrel shoulders 206 may be removable. Alternatively, the mandrel shoulders 206 may be integrally formed with the mandrel 200 such that the mandrel 200 comprises a unitary structure.

FIG. 20 illustrates the thermoplastic sandwich sheet 106 formed over the mandrel 200 into a tube portion 104. The tube portion 104 includes a pair of lip edges 128 formed into the opposing tube side edges 122. The lip edges 128 may be formed in the tube portion 104 as a result of the urging of the tube side edges 122 against the mandrel shoulders 206 under the application of forming pressure 400 (FIG. 16). As indicated above, such forming pressure 400 may be applied by a forming sheet 406 (FIG. 15).

FIG. 21 is an exploded end view of a pair of tube portions 104. The upper one of the tube portions 104 has lip edges 128 extending along the tube side edges 122 as may be formed using the mandrel 200 of FIG. 20. The lower one of the tube portions 104 has straight edges 126 extending along the tube side edges 122 as may be formed using the mandrel 200 of FIG. 15. The lip edges 128 may facilitate the coupling of the tube portions 104 together without the use of splice members 142 (FIG. 18).

FIG. 22 shows a structural tube 102 formed by assembling the tube portions 104 of FIG. 21. On each side of the structural tube 102, the lip edge 128 may be disposed in overlapping relation 130 to the straight edge 126. The straight edges 126 of the tube portion 104 may be trimmed such that a desired tube width 138 (e.g., tube inner diameter) may be achieved in the structural tube 102. An adhesive layer 152 may be installed between the lip edge 128 and the straight edge 126 to facilitate adhesive bonding therebetween. In this manner, the structural tube 102 may be assembled without splice members 142 (FIG. 18) which may simplify the assembly process and reduce part count.

FIG. 23 is an end view of a mandrel 200 in an embodiment having a single mandrel shoulder 206 on one side of the mandrel 200. As indicated above, the mandrel shoulder 206 may comprise a separate strip (not shown) that may be separately attached to the mandrel 200, or the mandrel shoulder 206 may be integrally formed with the mandrel 200. The forming sheet 406 (FIG. 15-16) is omitted from FIG. 23 for clarity.

FIG. 24 shows the thermoplastic sandwich sheet 106 formed over the mandrel 200. The tube portion 104 includes a single lip edge 128 formed into one of the opposing tube side edges 122 of the tube portion 104. The lip edge 128 may be formed in the tube side edge 122 in response to forming pressure 400 urging the tube side edge 122 against the mandrel shoulder 206.

FIG. 25 is an exploded end view of a pair of tube portions 104. Each one of the tube portions 104 has a lip edge 128 and a straight edge 126. The upper tube portion 104 is oriented relative to the lower tube portion 104 such that the lip edges 128 are disposed opposite the straight edges 126.

FIG. 26 illustrates a structural tube 102 formed by assembling the tube portions 104 shown in FIG. 25. Each one of the lips edges 128 is disposed in overlapping relation 130 to a straight edge 126 and may be bonded together using an adhesive layer 152. As indicated above, one or more of the straight edges 126 may be trimmed to achieve a desired tube width 138 in the structural tube 102. Although the structural tube 102 is assembled with two (2) of the tube portions 104, the structural tube 102 may be assembled using three (3) or more tube portions 104 to form an enclosed structural tube 102. The tube portions 104 may be similarly shaped or the tube portions 104 may have dissimilar shapes.

Figure 27:
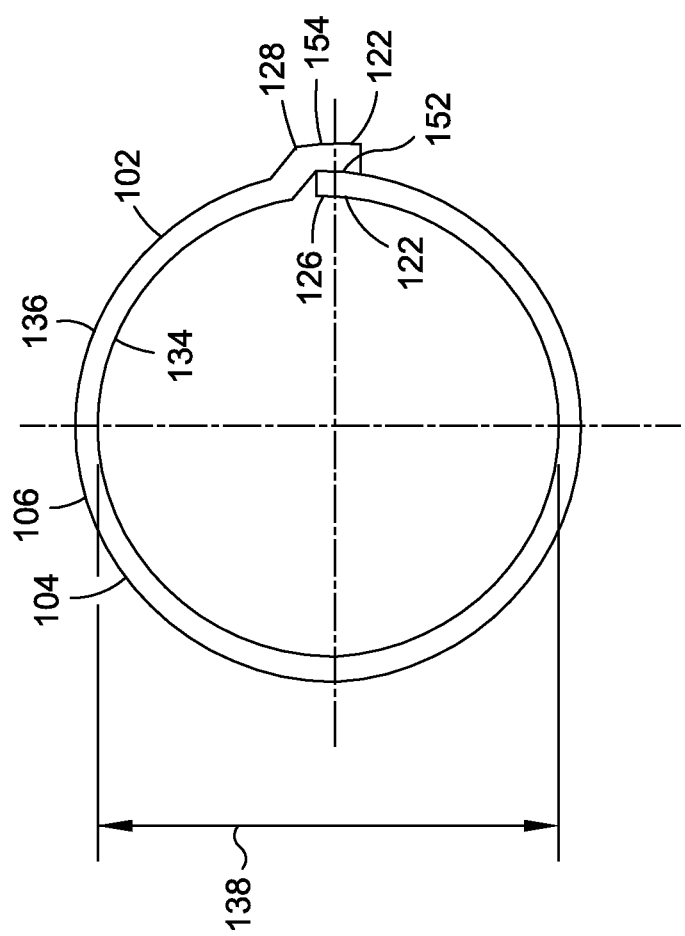
FIG. 27 is an end view of an alternative embodiment of a structural tube formed into a circular configuration and having a lip edge coupled to a straight edge.

FIG. 27 shows a structural tube 102 formed from a single tube portion 104. The tube portion 104 may have a generally circular cross sectional shape and may include a lip edge 128 coupled in overlapping relation to a straight edge 126. The lip edge 128 may coupled to the straight edge 126 by means of an adhesive layer 152 that may be installed therebetween. Advantageously, the structural tube 102 configuration shown in FIG. 27 significantly simplifies the assembly process due to the minimal part count.

FIG. 28 shows a structural tube 102 configured as a duct 180 such as may be used in an environmental control system of an aircraft. The duct 180 includes a tube portion 104 having tube side edges 122 that are joined by a splice member 142. The duct 180 may include a spud 184 that may be fastened to the tube portion 104 and may protrude outwardly from the duct 180. The duct 180 may facilitate the routing of conditioned air from the main conduit of the structural tube 102 to an outlet (not shown) such as may be located above a passenger seat (not shown) of a passenger aircraft (not shown). Although FIG. 20 illustrates a single spud 184 extending outwardly from the structural tube 102, the duct 180 may include any number of spuds 184 extending outwardly from the structural tube 102 at any angular orientation and at any location along the length of the structural tube 102.

FIG. 29 shows a cross-section of the structural tube 102 at the attachment of the spud 184 to the structural tube 102. In an embodiment, the spud 184 may include a spud flange 186 to facilitate attachment of this spud 184 to the structural tube 102. For example, the spud 184 may be formed of any suitable material that is compatible with the material of the structural tube 102. In addition, the spud flange 186 may be shaped complementary to the tube outer surface 136. The spud flange 186 may be attached to the structural tube 102 by any suitable means including by adhesive bonding, by welding, or by other suitable means.

Figure 30:
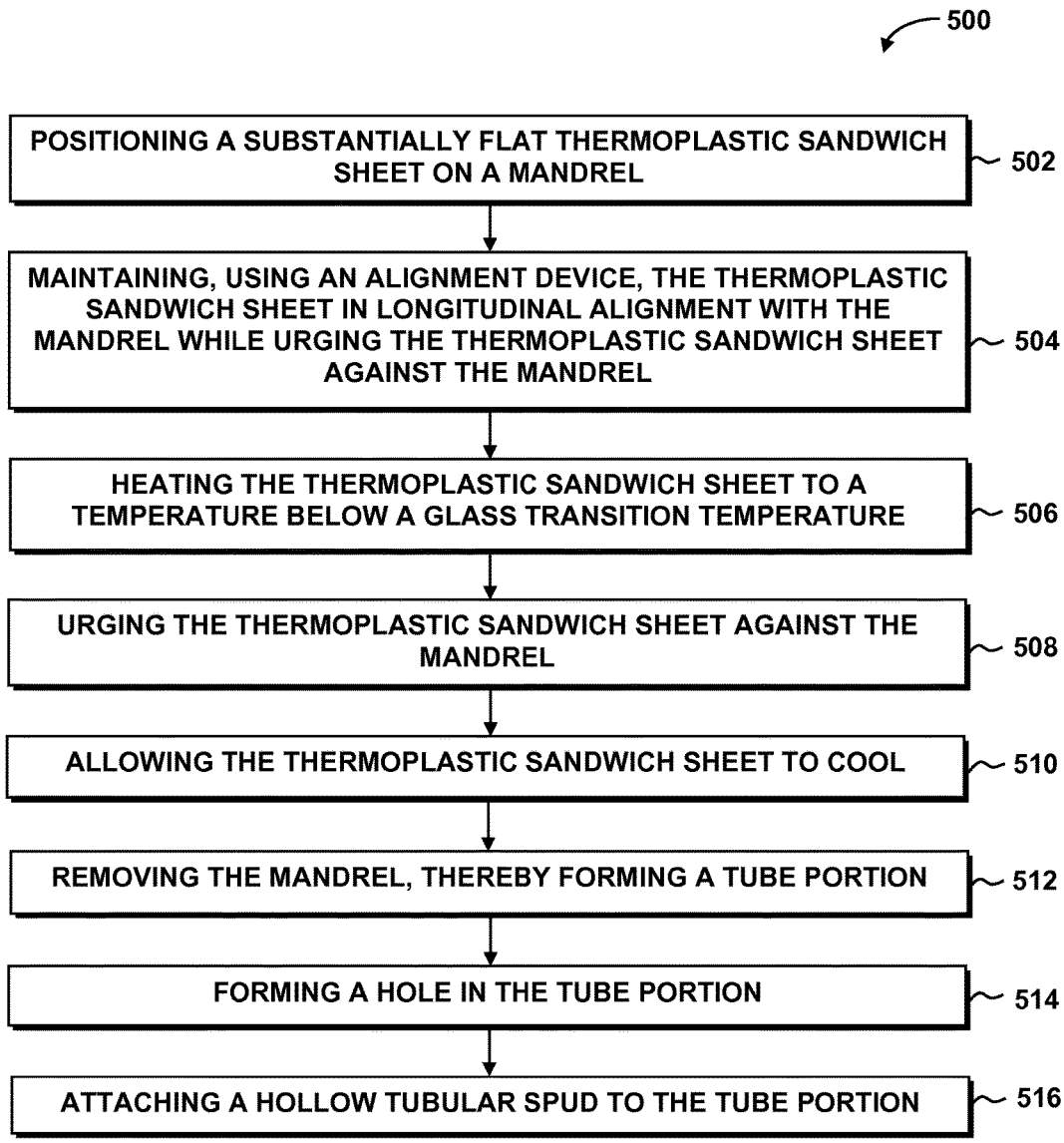
FIG. 30 is a flow diagram including one or more operations that may be included in a method for forming a tube portion.

In FIG. 30, shown is a flow diagram of a method 500 for forming a structural tube 102 (FIG. 10) from a thermoplastic sandwich sheet 106 (FIG. 10). Advantageously, the structural tube 102 as formed by the disclosed method may be implemented for use in a variety of applications. For example, the structural tube 102 may be implemented for use as a duct 180 of an environmental control system of an aircraft. Advantageously, the method disclosed herein provides a means for forming structural tubes 102 at a significantly reduced cost relative to the costs associated with conventional fabrication methods. For example, the method provides a means for fabricating structural tubes 102 with reduced raw material costs, reduced processing costs, and reduced labor costs.

In addition, the method disclosed herein provides a simplified process for fabricating structural tubes 102 (FIG. 10) with thermal insulating capability in a reduced amount of time relative to conventional methods. For example, the method disclosed herein avoids the need for separately bonding foam insulation onto a separately-formed duct assembly as may be required by conventional fabrication methods. Furthermore, structural tubes 102 fabricated using the methods disclosed herein may result in a reduced amount of waste material and scrap. In addition, the methods disclosed herein may comprise an environmentally-friendly process due to the ability to recycle and reform unused thermoplastic material of the thermoplastic sandwich sheet 106 (FIG. 10). Even further, the method disclosed herein provides for the ability to form structural tubes 102 using thermoplastic materials having favorable performance characteristics with regard to fire, smoke, and toxic gas (FST) emissions relative to materials used in conventional tube forming processes.

Step 502 of the method 500 (FIG. 30) may include positioning a substantially flat thermoplastic sandwich sheet 106 on or against a mandrel 200 as shown in FIG. 15. The mandrel 200 may be provided in a simply curved or a singly-curved cross sectional shape. However, it is contemplated that the mandrel 200 may also include a slight compound curvature wherein the substantially flat thermoplastic sheet may generally conform to the mandrel shape 208 without the occurrence of wrinkles or excess material.

Step 504 of the method 500 (FIG. 30) may include maintaining the thermoplastic sandwich sheet 106 in longitudinal alignment with the mandrel 200. Longitudinal alignment may be maintained between the thermoplastic sandwich sheet 106 and the mandrel 200 by one or alignment devices 220. For example, FIG. 13 illustrates one or more tooling pins 222 that may be extended upwardly from the mandrel 200 along the tangent line 224 where the substantially flat thermoplastic sandwich sheet 106 initially contacts the mandrel surface 204. The tooling pins 222 may be received within a corresponding pair of bores 116 that may be formed in the thermoplastic sandwich sheet 106. The tooling pins 222 may be configured to allow for removal of the thermoplastic sandwich sheet 106 from the mandrel 200 after forming the thermoplastic sandwich sheet 106 into the shape of the mandrel 200.

Step 506 of the method 500 (FIG. 30) may include heating the thermoplastic sandwich sheet 106 (FIG. 14) to a temperature below the glass transition temperature of the thermoplastic material from which the thermoplastic sandwich sheet 106 is comprised. As indicated above, thermoplastic sandwich sheet 106 may be heated prior to urging the thermoplastic sandwich sheet 106 against the mandrel 200. For example, the thermoplastic sandwich sheet 106 may be heated by placing the thermoplastic sandwich sheet 106 in an oven, and positioning the thermoplastic sandwich sheet 106 on the mandrel 200 after the thermoplastic sandwich sheet 106 is heated. The thermoplastic sandwich sheet 106 may also be heated by placing the thermoplastic sandwich sheet 106 on a forming surface 228 (FIG. 14) for conductively transferring heat into the thermoplastic sandwich sheet 106 prior to wrapping the thermoplastic sandwich sheet 106 around the mandrel 200 (FIG. 14).

Optionally, the mandrel 200 may also be heated to assist in maintaining the temperature of the thermoplastic sandwich sheet 106 (FIG. 15) just below the glass transition temperature or approaching the glass transition temperature. The forming sheet 406 (e.g., rubber layer 410—FIG. 15) may also be heated to assist in heating the thermoplastic sandwich sheet 106. If the glass transition temperature of the thermoplastic sandwich sheet 106 is approximately 300° F., the thermoplastic sandwich sheet 106 may be heated to a temperature that is in the range of from approximately 0-50° F. below the glass transition temperature. However, it is contemplated that the thermoplastic sandwich sheet 106 may also be heated to a temperature that temporarily exceeds the glass transition temperature of the thermoplastic sandwich sheet 106 at one or more locations along the length and/or width of the thermoplastic sandwich sheet 106.

Step 508 of the method 500 (FIG. 30) may include urging the substantially flat thermoplastic sandwich sheet 106 against the mandrel surface 204 as shown in FIG. 16. For example, the thermoplastic sandwich sheet 106 may be substantially wrapped around the mandrel 200 to cause the thermoplastic sandwich sheet 106 to generally assume the mandrel shape 208. Forming pressure 400 (FIG. 16) may be applied to the thermoplastic sandwich sheet 106 by a pressurizing device 404. For example, a forming sheet 406 comprised of stretchable elastic material such as a silicone rubber layer 410 may be extended over the thermoplastic sandwich sheet 106. The forming pressure 400 may be generated at least partially as a result of elastomeric force acting on the thermoplastic sandwich sheet 106 due to optional pre-stretching of the elastic forming sheet 406. Optionally, the forming sheet 406 may be mounted to a generally rigid frame 408 (FIG. 16) which may be sealed to the mandrel 200 and/or to the mandrel base 202 as shown in FIG. 16, to effectuate the sealing of the elastic forming sheet 400 (e.g., rubber layer 410) to the mandrel 200 and/or mandrel base 202. Vacuum pressure 412 may be applied to a region between the forming sheet 406 and the mandrel 200 to urge the thermoplastic sandwich sheet 106 against the mandrel surface 204.

Step 510 of the method 500 (FIG. 30) may include allowing the thermoplastic sandwich sheet 106 (FIG. 16) to cool. Cooling of the thermoplastic sandwich sheet 106 may be facilitated by active cooling such as with a cooling device (not shown). For example, a fan may be directed toward the mandrel 200 (FIG. 16) and/or tube portion 104 (FIG. 16) to blow cooling air over the mandrel 200 and/or thermoplastic sandwich sheet 106 to draw heat away. Optionally, the mandrel 200 may include provisions for circulating fluid through the mandrel 200 to assist in drawing heat out of the mandrel 200 and the tube portion 104. The thermoplastic sandwich sheet 106 may be passively and/or actively cooled such as to ambient temperature.

Step 512 of the method 500 (FIG. 30) may include separating the tube portion 104 from the mandrel 200. The tube portion 104 (FIG. 18) may advantageously retain the mandrel shape 208 (FIG. 18) of the mandrel 200 with minimal or negligible spring-back as result of the creep forming of the thermoplastic sandwich sheet 106 (FIG. 18) by heating the thermoplastic sandwich sheet 106 to a temperature approaching the glass transition temperature. The tube portion 104 may be formed with a desired configuration of the tube side edges 122 (FIG. 18). For example, FIG. 18 illustrates a structural tube 102 formed by assembling a pair of tube portions 104 each having tube side edges 122 formed in a straight edge 126 configuration to facilitate coupling the tube side edges 122 using splice members 142.

In a further embodiment, FIG. 22 illustrates a structural tube 102 including one tube portion 104 having lip edges 128 and a mating tube portion 104 having straight edges 126. The lip edges 128 may be mated with the straight edges 126 using an adhesive layer 152 for bonding therebetween. FIG. 26 illustrates a further embodiment of a structural tube 102 comprising a pair of substantially similarly-configured tube portions 104 wherein each tube portion 104 has a lip edge 128 and a straight edge 126 for adhesively bonding with a mating tube portion 104. As may be appreciated, the tube portions 104 may be formed in wide variety of configurations and are not limited to the embodiments illustrated in the figures.

Step 514 of the method 500 (FIG. 30) may include forming one or more holes 182 in a tube portion 104 as shown in FIG. 28. The hole 182 may be formed in the tube portion 104 as part of the process of fabricating a duct 180 such as for an environmental control system of an aircraft or other vehicle. However, the hole 182 may be generated for any one a variety of purposes and is not limited to fabrication of a duct 180 for an environmental control system.

Step 516 of the method 500 (FIG. 30) may include attaching a hollow tubular spud 184 to the tube portion 104. For example, FIG. 29 illustrates a spud 184 mounted to the tube portion 104. The spud 184 may include a spud flange 186 that may be adhesively bonded or otherwise attached to the tube inner surface 134 or the tube outer surface 136 of the tube portion 104. The spud 184 may be extended through the hole 182 in the tube portion 104 such that the spud 184 protrudes outwardly from the tube portion 104 and is generally aligned with the hole 182.

Figure 31:
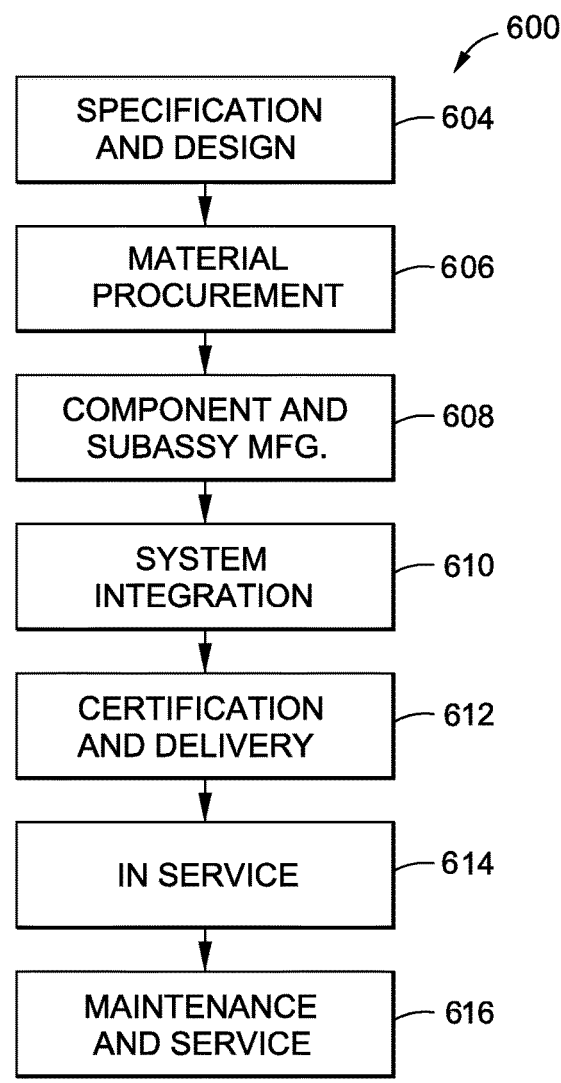
FIG. 31 is a flow diagram of an aircraft service and production method.
Figure 32:
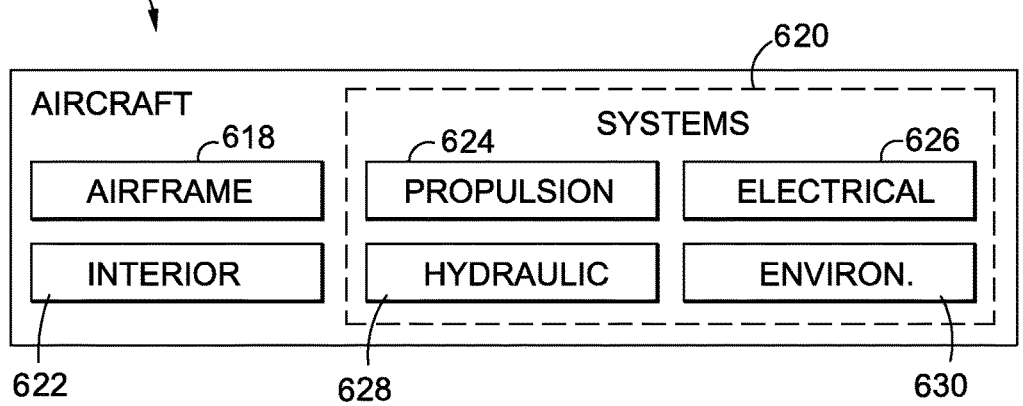
FIG. 32 is a block diagram of an aircraft.

In FIGS. 31-32, embodiments of the disclosure may be described in the context of an aircraft manufacturing and service method 600 as shown in FIG. 31 and an aircraft 602 as shown in FIG. 32. During pre-production, exemplary method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown FIG. 32, the aircraft 602 produced by exemplary method 600 may include an airframe 618 with a plurality of systems 620 and an interior 622. Examples of high-level systems 620 include one or more of a propulsion system 624, an electrical system 626, a hydraulic system 628, and an environmental system 630. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more apparatus embodiments, method embodiments, or a combination thereof may be utilized during the production stages 608 and 610, for example, by substantially expediting assembly of or reducing the cost of an aircraft 602. Similarly, one or more of apparatus embodiments, method embodiments, or a combination thereof may be utilized while the aircraft 602 is in service, for example and without limitation, to maintenance and service 616.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of forming a tube, comprising the steps of:
   mounting a substantially flat thermoplastic sandwich sheet on a mandrel surface of a mandrel such that tooling pins extending outwardly from the mandrel surface are received in corresponding bores formed in the thermoplastic sandwich sheet, the thermoplastic sandwich sheet comprising a spaced pair of individual face sheets separated by a core interconnecting the face sheets;
   urging the thermoplastic sandwich sheet against the mandrel surface;
   maintaining, using the tooling pins received within the bores, the thermoplastic sandwich sheet in longitudinal alignment with the mandrel while urging the thermoplastic sandwich sheet against the mandrel surface;
   creep forming the thermoplastic sandwich sheet including heating the thermoplastic sandwich sheet while maintaining a temperature of the face sheets below a glass transition temperature;
   allowing the thermoplastic sandwich sheet to cool; and
   removing the mandrel, thereby forming a tube portion having opposing tube side edges.

2. The method of claim 1 further comprising the step of:
   coupling the tube side edges together.

3. The method of claim 2 wherein the step of coupling the tube side edges together comprises:
   attaching a splice member to the tube side edges using at least one of the following:
      adhesively bonding;
      ultrasonic welding;
      induction welding; and
      mechanically fastening.

4. The method of claim 1 wherein the step of urging the thermoplastic sandwich sheet against the mandrel surface comprises:
   mounting a forming sheet over the thermoplastic sandwich sheet;
   applying, using the forming sheet, a forming pressure to the thermoplastic sandwich sheet; and
   urging the thermoplastic sandwich sheet against the mandrel surface in response to applying the forming pressure.

5. The method of claim 4 wherein the forming sheet is a rubber layer, the step of mounting the forming sheet over the thermoplastic sandwich sheet comprises:
   installing the rubber layer over the thermoplastic sandwich sheet;
   sealing the rubber layer against the mandrel; and
   applying a vacuum pressure to a region between the rubber layer and the mandrel.

6. The method of claim 5 further comprising the steps of:
   heating the rubber layer; and
   conductively heating the thermoplastic sandwich sheet in response to heating the rubber layer.

7. The method of claim 1 wherein the step of heating the thermoplastic sandwich sheet comprises:
   heating the mandrel.

8. The method of claim 1 further comprising the steps of:
   forming a hole in the tube portion; and
   attaching a hollow tubular spud to the tube portion such that the spud extends outwardly from the tube portion, the spud being generally aligned with the hole.

9. A method of forming a tube, comprising the steps of:
   positioning a substantially flat thermoplastic sandwich sheet on a mandrel surface of a mandrel such that tooling pins extending outwardly from the mandrel surface are received in corresponding bores formed in the thermoplastic sandwich sheet, the thermoplastic sandwich sheet comprising a spaced pair of individual face sheets separated by a core interconnecting the face sheets;
   mounting a forming sheet over the thermoplastic sandwich sheet;
   creep forming the thermoplastic sandwich sheet including heating the thermoplastic sandwich sheet while maintaining a temperature of the face sheets below a glass transition temperature;
   applying, using the forming sheet, a forming pressure to the thermoplastic sandwich sheet;
   urging the thermoplastic sandwich sheet against the mandrel surface in response to applying the forming pressure;
   maintaining, using the tooling pins received within the bores, the thermoplastic sandwich sheet in longitudinal alignment with the mandrel while urging the thermoplastic sandwich sheet against the mandrel surface;
   allowing the thermoplastic sandwich sheet to cool to ambient temperature; and
   removing the mandrel, thereby forming a tube portion having opposing tube side edges.

10. The method of claim 9 further comprising the step of:
    providing the forming sheet as a stretchable elastic sheet.

11. The method of claim 9 further comprising the step of:
    sealing the forming sheet to the mandrel.

12. The method of claim 11 further comprising the step of:
    applying a vacuum pressure to a region between the forming sheet and the mandrel.

13. The method of claim 11 further comprising the steps of:
    forming at least two of the tube portions; and
    coupling the tube portions together to form a structural tube.

14. A method of forming a duct, comprising the steps of:
    positioning a substantially flat thermoplastic sandwich sheet on a mandrel surface of a mandrel such that tooling pins extending outwardly from the mandrel surface are received in corresponding bores formed in the thermoplastic sandwich sheet, the thermoplastic sandwich sheet comprising a spaced pair of individual face sheets separated by a core interconnecting the face sheets;

creep forming the thermoplastic sandwich sheet including heating the thermoplastic sandwich sheet while maintaining a temperature of the face sheets below a glass transition temperature;

urging the thermoplastic sandwich sheet against the mandrel;

maintaining, using the tooling pins received within the bores, the thermoplastic sandwich sheet in longitudinal alignment with the mandrel while urging the thermoplastic sandwich sheet against the mandrel surface;

allowing the thermoplastic sandwich sheet to cool;

removing the mandrel, thereby forming a tube portion;

forming a hole in the tube portion having opposing tube side edges; and attaching a hollow tubular spud to the tube portion in general alignment with the hole such that the spud extends outwardly from the tube portion.

15. The method of claim 1 wherein the step of mounting the substantially flat thermoplastic sandwich sheet on the mandrel surface such that the tooling pins are received in the bores formed in the thermoplastic sandwich sheet comprises:

mounting the thermoplastic sandwich sheet on the mandrel surface having the tooling pins positioned along a tangent line of the mandrel surface, the tangent line being a line along which the substantially flat thermoplastic sandwich sheet initially contacts the mandrel.

16. The method of claim 1 wherein the step of mounting the substantially flat thermoplastic sandwich sheet on the mandrel surface such that the tooling pins are received in the bores formed in the thermoplastic sandwich sheet comprises:

receiving the tooling pins within the bores positioned outside of net trim lines located on opposite sheet ends of the thermoplastic sandwich sheet.

17. The method of claim 1 further comprising the step of:
adjusting a spacing between the tube side edges prior to coupling the tube side edges together.

18. The method of claim 1 further comprising the step of:
trimming the tube side edges to control a spacing therebetween.

19. The method of claim 1 wherein:
the mandrel surface has a semi-round cross-sectional shape.

* * * * *